United States Patent Office 3,532,464
Patented Oct. 6, 1970

3,532,464
METHOD OF MAKING MAGNESIUM PHOSPHIDE
Wolfgang Friemel, Kirschhausen uber Heppenberg, Germany, assignor to Werner Freyberg, Kirschhausen uber Heppenheim, Germany
No Drawing. Filed Apr. 4, 1967, Ser. No. 628,308
Claims priority, application Germany, Apr. 7, 1966, F 48,910
Int. Cl. C01b 25/08
U.S. Cl. 23—204
9 Claims

ABSTRACT OF THE DISCLOSURE

Magnesium phosphide, for use as an in situ producer of insecticidal gaseous hydrogen phosphide is produced by the exothermic reaction of magnesium and red phosphorous. The reaction comprises forming a mixture of magnesium, red phosphorous, and at least one material which is a retardant for said exothermic reaction.

---

This invention relates to a method of making magnesium phosphide by the reaction of magnesium and red phosphorus and further relates to a method of combatting insects, particularly by means of gassing cereal and foodstuff.

In the last decades, the use of hydrogen phosphide, particularly as a gaseous material to protect cereals and various foodstuff from insect attack, has rapidly increased in importance. Hydrogen phosphide has even been used in combatting rodents in the field. Hydrogen phosphide may also be used for the synthesis of organo-phosphine compounds.

In view of the fact that pure hydrogen phosphide gas is difficult to handle because it is highly self-igniting in nature, it has been found advantageous to use mostly phosphides of earth alkali and earth metals which phosphides are easily decomposable under the effect of moisture to generate in situ the hydrogen phosphide. For this purpose usually calcium, magnesium and aluminum phosphide may be considered. While calcium phosphide has been used almost exclusively for combatting rodents in open fields, heretofore mostly aluminum phosphide has been used for gassing infested cereals or foodstuff in storage. For this use, however, it is desirable that a fast and complete gassification of the phosphides occur. Aluminum phosphide, however, has several disadvantages which detract from its ability to fulfill these requirements. For instance, three to five days are needed for the entire release of the hydrogen phosphide at 20° C. and at average moisture conditions of the atmosphere and there is a residue of 2–3% of aluminum phosphide; the latter occurs because of occlusions formed within aluminum oxide hydrate crystals during formation as a result of the reaction with moisture. The aluminum phosphide confined in this manner can be reacted only by means of hot acids.

Magnesium phosphide is free of all the above-noted disadvantages. Under similar conditions, magnesium phosphide releases the maximum amount of hydrogen phosphide within 12–24 hours without an unreacted residue which is 10 to 100 times less the amount produced in the case of aluminum phosphide. Further, even the small residual magnesium phosphide is not solidly enclosed and they continue to gassify during further contact with moisture.

Thus, magnesium phosphide has proved to be far superior to known agents used for gassing cereals and foodstuff. Despite all these advantages, it has not had wide commercial application because of the substantial technical difficulties heretofore encountered in the manufacture of this material, particularly in larger quantities.

German Pat. No. 923,999 describes a method of making magnesium phosphide based on alumino-thermal reactions between phosphoric acid salts of alkali earths and a readily oxidizable metal, like aluminum or magnesium, by means of exothermically reacting the mixture near the place where one desires to use the hydrogen phosphide. This method, however, is suitable only for making very small quantities encapsulated in cartridges. This process may be carried out only in open air and to use this process in making larger quantities, for example, inside a grain silo, would be impermissible in view of the great fire hazard that exists during the process.

Other known methods of making magnesium phosphide are based mostly on the conversion of heavy metal phosphide with metallic magnesium and require a heating of the mixture to 300–500° C. and require the application of thermal energy. When practicing these methods, it is unavoidable to prevent contamination of the magnesium phosphide product by substantial quantities of unconverted heavy metal phosphide, heavy metals and their oxides. These compounds are extremely toxic in most cases, for example, the zinc phosphide proposed as starting material in German Pat. No. 1,035,396 is used on a large scale as rat poison. A magnesium phosphide contaminated in such a manner is not suitable for use in treating foodstuffs and is entirely eliminated therefrom for hygienic reasons.

As is apparent from the data set forth in German Pat. No. 736,700, a magnesium phosphide manufactured in accordance with the foregoing methods does not produce efficient results and is therefore uneconomical. For gassing foodstuff, it is necessary that the magnesium phosphide have the highest possible concentration to reduce the residual reaction products which remain after the gassification, since even the pure phosphide, although harmless per se, produces impurities and has to be kept at a minimum level in accordance with the laws controlling foodstuff. This German patent further discloses that the fusion of magnesium and phosphorus is highly exothermic and reacts very violently which, in case of larger quantities, results in an explosion-like reaction. This violent reaction could not heretofore be substantially dampened even by means or diluting materials such as magnesium oxide, magnesium carbonate and ammonium chloride, etc. Experiments have confirmed this disclosure.

In view of the foregoing, it is an object of the present invention to provide a method resulting in a highly concentrated (possibly 60–80%) magnesium phosphide which has no toxic contaminants and which is made without the use of thermal energy and complex machinery and whereby the reaction rate is effectively dampened and an explosion-like reaction is prevented.

Briefly stated, the inventive method of making magnesium phosphide of magnesium and red phosphorous resides in that at least one non-poisonous material for effectively controlling the reaction rate of the neutralizing effect is mixed with the reaction mixture of magnesium and red phosphorus, whereby the said material is capable of binding at least temporarily one part of the generated reaction heat by means of physical and/or chemical changes.

In a preferred embodiment of the invention, the reaction retardant is a very finely ground voluminous powder which is designated in the trade as being of "light" or "very light" density and, for such an embodiment, a powder made of an alkali earth oxide, alkali earth carbonate or a light metal soap is preferred. Magnesium oxide, magnesium carbonate, magnesium stearate or calcium stearate are preferred, and it is to be understood that mixtures of these materials are also suitable.

The materials available in the form of "light" or "very light" density powders differ substantially in weight per unit volume from the same materials obtainable in their more common forms. In this connection reference is made to the following table:

| Name of material | Density of the material | |
|---|---|---|
| | Heavy or common form | Light |
| Magnesium oxide | 775 grams per liter | 150 grams per liter. |
| Magnesium carbonate | 590 grams per liter | 85 grams per liter. |
| Calcium carbonate | 770 grams per liter | 330 grams per liter. |
| Magnesium stearate | | 180 grams per liter. |
| Calcium stearate | | 130 grams per liter. |

The "light" or "very light" powders to be used have a weight less than 350 grams per litter and preferably less than 200 grams per liter in a loose or unpacked condition. Obviously, the optimum weight depends on the particular powder to be used. The most suitable conditions for the reaction may be determined by means of simple tests within the scope of the invention.

In a second preferred embodiment of the invention, liquid or solid, and preferably saturated, hydrocarbons, such as paraffins or paraffin oils, may be used as the reaction retardant material. It is also advantageous to use the retardant when in liquid form in combination with a solid material, such as magnesium oxide, which either absorbs the liquid or forms therewith a mixture easy to handle.

In a further embodiment of the present invention, a solid material having a melting point under 1000° C. is used, and particularly adapted for this purpose are dried calcium chloride, magnesium chloride, aluminum chloride, sodium chloride, potassium chloride, sodium carbonate, potassium carbonate, or mixtures thereof.

For the present novel method of making magnesium phosphide of magnesium and red phosphorus, the reactive agents are used preferably in a near-stoichiometric ratio. The reaction is carried out preferably in a crucible or tub-like reaction vessel and can be initiated electrically by igniting masses or the like. The quantity of reaction retardant added is not critical; it has been found, however, that an addition of 5–60% is the most favorable. It is understood that this percentage depends on the nature of the material to be added, and a ratio of over 50% is, in general, not unfavorable since it results in a less pure magnesium phosphide. In most cases, it is preferred that the weight ratio of the reaction retardant be between 10–30%.

It is not known exactly how the reaction retardant added according to this invention works during the reaction. According to the results presently available, it appears that the effect of the added materials is based on two separate individual effects. Particularly in the case of the use of "light" or "very light" materials, a kind of diluting effect appears due to the substantially larger piled volume so that the reacting phosphorus and magnesium particles are spaced from one another in a larger measure. Furthermore, the reactive particles are surrounded by the particles of the reaction retardant so that a screening takes place.

In view of the fact that the conversion between magnesium and red phosphorus is highly exothermic and that an extremely rapid reaction may take place, the reaction occurs in an explosion-like manner without materials to control the rate of reaction. Some of the generated reaction heat appears to be taken up in the form of melt enthalpy of the added material, and certain materials undergo an endothermal decomposition due to the heat generated by the reaction. The freed reaction heat at least partially increases the enthalpy of the added reaction retardants because the enthalpies of resulting melting processes or endothermal reactions are heat absorbing thereby avoiding an over-heating in the reaction zone and preventing an explosion-like reaction. The addition of materials to an exothermic reaction for the binding of some of the reaction heat is a known and usual procedure. In the present case, however, it is considered extraordinarily surprising that in the preparation of magnesium phosphide from magnesium and red phosphorus in the presence of certain reaction retardants, it is possible to obtain a calm and uniform reaction whereas heretofore it was believed that this reaction could not be controlled since every known case resulted in an explosion-like and uncontrolled reaction not dampened by the use of a diluting material.

In practicing the present method, further technical advantages are received which are not achieved under the known methods of making magnesium phosphide. The use of "light" or "very light" reaction retardants results in reaction mixtures which have flown properties similar to liquids because of the fine grains of all reactive agents and because of the relatively low density. This is particularly advantageous during mixing and subsequent filling of the reaction vessels.

It is also possible in practicing the present invention to produce a magnesium phosphide product which is hard and coarse grained or spongy and easily comminuted. Thus, for example, if 10–20% by weight of magnesium oxide, calcium chloride or sodium chloride is added, a stone hard, greenish-black, crystalline magnesium phosphide is obtained. On the other hand, if a small percentage of "light" calcium carbonate or "very light" magnesium carbonate is added to the above reaction retardants, an almost light green, very loose, easily comminutable magnesium phosphide is obtained.

The reaction products obtained are in most cases between 90–100% of theoretical because there is no substantial loss through combustion or expulsion of the materials during the reaction. The percentage of the magnesium phosphide in the product depends on the nature and percentage of the added neutralizing material and usually lies between 60–80%.

It has been determined that the violence of the reaction may be further dampened and the efficiency of exploitation may be substantially increased if air and particularly oxygen are excluded from the reaction which is done, in practice, by loosely covering the vessel with a lid. It has been found that at high reaction temperatures the magnesium phosphide product will react with oxygen and results in producing undesired magnesium phosphate, an apparent disadvantage of the prior art not known heretofore.

The following examples serve to further clarify the method of the present invention.

EXAMPLE 1

115 grams of magnesium powder are thoroughly mixed with 85 grams of red phosphorus, 40 grams of light magnesium oxide and 10 grams of very light magnesium carbonate; the mixture is ignited in an open reaction vessel. The mixture reacts violently with white flame; the reaction does not occur in an explosition-like manner.

Yield: 150 grams=60%, $Mg_3P_2$ content=65%.

EXAMPLE 2

1.85 kilograms of magnesium powder, 1.36 kilograms of red phosphorus and 0.8 kilogram of light magnesium oxide are thoroughly mixed and then electrically ignited in a covered reaction vessel. The reaction proceeds in a very calm manner and results in a dark green granular magnesium phosphide.

Yield: 3.9 kilograms=98%, $Mg_3P_2$ content=71%.

EXAMPLE 3

1.84 kilograms of magnesium powder and 1.36 kilograms of red phosphorus are thoroughly mixed with 0.64 kilogram of light magnesium oxide and 0.16 kilogram of light calcium carbonate; the mixture is subsequently electrically ignited in a covered reaction vessel, the reaction producing the phosphide proceeds calmly and uniformly. The resulting light green phosphide is loose and is easily comminutable.

Yield: 3.85 kilograms=97%, $Mg_3P_2$ content=68%.

EXAMPLE 4

2 kilograms of magnesium powder, 1.6 kilograms of red phosphorus and 400 grams of finely pulverized dehydrated calcium chloride are mixed as rapidly as possible and the mixture is ignited in a covered reaction vessel. The reaction proceeds rapidly but is not excessively violent. The resulting phosphide is stone hard and is of a greenish-black color with a graphite-like appearance.

Yield: 3.6 kilograms=90%, $Mg_3P_2$ content=80%.

EXAMPLE 5

2 kilograms of fine magnesium shavings, 1.6 kilograms of red phosphorus are well mixed with 400 grams of sodium carbonate and the mixture is subsequently ignited in a covered reaction vessel. The phosphide obtained had a brownish color.

Yield: 3.6 kilograms=90%, $Mg_3P_2$ content=77%.

EXAMPLE 6

400 grams of light magnesium oxide are mixed with 160 grams of paraffin oil until the liquid is well absorbed. Subsequently, the mixture is lengthily mixed with 1.92 kilograms of magnesium powder and 1.52 kilograms of red phosphorus. After ignition in a covered reaction vessel, the reaction proceeds rapidly with moderate violence. The phosphide has a black crystalline appearance.

Yield: 3.5 kilograms=88%, $Mg_3P_2$ content=75%.

EXAMPLE 7

2 kilograms of coarse magnesium powder, 1.6 kilograms of red phosphorus and 400 grams of magnesium stearate are mixed and the mixture is ignited in a covered, half-full reaction vessel. A greenish-black, loose reaction product results.

Yield: 3.4 kilograms=85%, $Mg_3P_2$ content=75%.

EXAMPLE 8

8 kilograms of magnesium powder, 6 kilograms of red phosphorus and 6 kilograms of light magnesium oxide are thoroughly mixed in a drum mixer for at least 30 minutes. The mixture is ignited in a reaction vessel covered with a heavy lid preferably by means of an electrical resistance wire. After a few minutes the calm and uniform reaction is completed producing a product which is grayish-green.

Yield: 19.2 kilograms=96%, $Mg_3P_2$ content=62%.

That which is claimed is:

1. Method of preparing magnesium phosphide by the exothermic reaction of magnesium and red phosphorus which comprises forming a mixture of magnesium, red phosphorus and at least one material which is a retardant for said exothermic reaction, said retardant being at least one member selected from the groups consisting of
    (A) alkaline earth oxides, alkaline earth carbonates and metallic soaps of long chain fatty acids and mixtures thereof, the members of this group being finely ground powders having a bulk weight of less than 350 grams per liter;
    (B) solid and liquid saturated hydrocarbons; and
    (C) calcium chloride, magnesium chloride, aluminum chloride, sodium chloride, potassium chloride, sodium carbonate, potassium carbonate and mixtures thereof,
    and inducing reaction by ignition of the said mixture to recover the product.
2. A method according to claim 1 wherein said retardant is a mixture containing at least one member selected from group (C).
3. Method according to claim 1, wherein the amount of retardant present is between 5–60%.
4. Method according to claim 1, wherein the reaction is carried out in the absence of oxygen.
5. Method according to claim 1, wherein said retardant is a powder selected from group (A).
6. Method according to claim 5, wherein said retardant is selected from the group consisting of magnesium oxide, magnesium carbonate, an alkaline earth stearate preferably magnesium stearate, calcium stearate and mixtures thereof.
7. The method according to claim 5, wherein the bulk weight of the said retardant is less than 200 grams per liter.
8. A method according to claim 1 wherein said retardant is a mixture containing at least one member selected from group (B).
9. Method according to claim 8, wherein said retardant is a mixture of paraffin oil and an alkaline earth compound selected from the group consisting of oxides, carbonates, and stearates.

References Cited

FOREIGN PATENTS 276,112    8/1927    Great Britain.
538,958    4/1957    Canada.

OSCAR R. VERTIZ, Primary Examiner

H. S. MILLER, Assistant Examiner